United States Patent [19]

Meynckens et al.

[11] Patent Number: 5,686,028

[45] Date of Patent: Nov. 11, 1997

[54] PROCESS FOR FORMING A COHERENT REFRACTORY MASS ON A SURFACE

[75] Inventors: Jean-Pierre Meynckens, Brussels; Léon-Philippe Mottet, Nalinnes, both of Belgium

[73] Assignee: Glaverbel, Brussels, Belgium

[21] Appl. No.: 902,864

[22] Filed: Jun. 23, 1992

Related U.S. Application Data

[63] Continuation-in-part of Ser. No. 728,884, Jul. 10, 1991, abandoned.

[30] Foreign Application Priority Data

Jul. 3, 1991 [LU] Luxembourg ............................. 87969

[51] Int. Cl.$^6$ ....................................................... F27D 1/16
[52] U.S. Cl. .............................. 264/30; 264/31; 264/82
[58] Field of Search ............................... 264/30, 31, 35, 264/36, 80, 81, 82, 83, 121, 309, 112; 427/140, 423, 427, 230; 266/281, 44; 501/133, 154

[56] References Cited

U.S. PATENT DOCUMENTS

| | | | |
|---|---|---|---|
| 2,809,126 | 10/1957 | Murphy, Jr. et al. | 117/54 |
| 3,141,917 | 7/1964 | Duncan . | |
| 3,229,970 | 1/1966 | Henry . | |
| 3,296,002 | 1/1967 | Hare | 106/40 |
| 3,348,929 | 10/1967 | Valtschev et al. | 29/180 |
| 3,684,560 | 8/1972 | Brichard et al. | 117/105.1 |
| 3,991,254 | 11/1976 | Takeuchi | 428/309 |
| 4,294,431 | 10/1981 | Steen et al. | 266/44 |
| 4,489,022 | 12/1984 | Robyn et al. . | |
| 4,542,888 | 9/1985 | Robyn et al. | 266/44 |
| 4,560,591 | 12/1985 | Plumat et al. | 427/422 |
| 4,900,484 | 2/1990 | Zlamal | 264/30 |
| 4,911,955 | 3/1990 | Mottet et al. | 427/423 |
| 4,981,628 | 1/1991 | Willard | 264/30 |
| 5,002,805 | 3/1991 | Robyn | 427/309 |
| 5,013,499 | 5/1991 | Willard | 264/30 |
| 5,061,526 | 10/1991 | Robyn et al. | 427/422 |
| 5,270,075 | 12/1993 | Robyn et al. | 427/201 |

FOREIGN PATENT DOCUMENTS

| | | |
|---|---|---|
| 871 496 | 2/1979 | Belgium . |
| 871496 | 2/1979 | Belgium . |
| 894 731 | 2/1983 | Belgium . |
| 09100427 | 2/1993 | Belgium . |
| 0 124 488 | 11/1984 | European Pat. Off. . |
| 0 252 621 | 1/1988 | European Pat. Off. . |
| 0 367 434 | 5/1990 | European Pat. Off. . |
| 0 425 668 | 10/1990 | European Pat. Off. . |
| 0 426 848 | 5/1991 | European Pat. Off. . |
| 0 519 730 | 12/1992 | European Pat. Off. . |
| 0 577 735 | 11/1994 | European Pat. Off. . |
| 58-172271 | 10/1983 | Japan . |
| 455 526 | 10/1936 | United Kingdom . |
| 1 330 894 | 9/1973 | United Kingdom . |
| 2 110 200 | 6/1983 | United Kingdom . |
| 2 118 164 | 10/1983 | United Kingdom . |
| 2 109 099 | 7/1985 | United Kingdom . |
| 2 154 228 | 9/1985 | United Kingdom . |
| 2 170 191 | 7/1986 | United Kingdom . |
| 2 190 671 | 11/1987 | United Kingdom . |
| 2 213 812 | 8/1989 | United Kingdom . |
| 2 234 502 | 2/1991 | United Kingdom . |
| 2 257 136 | 1/1993 | United Kingdom . |
| WO90/03848 | 4/1990 | WIPO . |
| 92 19566 | 11/1992 | WIPO . |

OTHER PUBLICATIONS

Fosbel T.R.P.—"The Total Repair Program That Seals Costly Coke Oven Damage, Inside or Doorside.", Fosbel, Inc., 1984.

"Refractory Materials: Their Manufacture And Uses", by ALfred B. Searle, 3rd Edition, 1953, pp. 407–423.

Affidavit of David C. Willard, Mar. 23, 1990.

Ministry of Technology—The Efficient Use of Fuel, London, 1958; Chapter 23—"Refractory And Insulating Materials", pp. 597–633.

The Coke Oven Managers' Year–Book, Nov. 1984; "Ceramic Welding Of Coke Ovens", by A.V. Parry et al., pp. 88–108.

Commissioner of the European Communities—Technical Coal Research, 1990; "A Study On Ceramic Welding In Relation To Coke Oven Chamber Repair With An Evaluation Of Its Use In Practice", pp. III–VII.

"Application Of The Ceramic Welding Process To The Maintenance And The Repair Of Glass Furnaces", by P. Deschepper et al.

British Coal—Coal Research Establishment, Dec. 1989 "A Study Of Ceramic Welding In Relation To Coke Oven Chamber Repair, With An Evaluation Of Its Use In Practice", pp. 1–195.

(List continued on next page.)

Primary Examiner—Christopher A. Fiorilla
Attorney, Agent, or Firm—Spencer & Frank

[57] ABSTRACT

A process for forming a coherent refractory mass on a surface of a refractory, which refractory includes at least one silicon compound, the process including providing a mixture including (1) combustible particles including silicon particles, (2) refractory particles of one or a plurality of substances which constitute a major portion by weight of the mixture, and (3) particles of another substance or precursor of the another substance which particles are nonmetallic and which another substance causes incorporation of silica, formed by combustion of the silicon particles, into a crystalline lattice of a compound formed between the silica and the another substance within the coherent refractory mass to be formed; and projecting the mixture against the surface of a refractory, simultaneously with oxygen, so that the combustible particles react in an exothermic manner with the projected oxygen and release sufficient heat to form the coherent refractory mass under action of heat of combustion and so that silica is formed by combustion of the silicon particles, which silica is incorporated into the crystalline lattice of the compound formed between the silica and the another substance such that the coherent refractory mass adheres durably to the surface of the refractory and retains this adherence under repeated variations in thermal conditions.

7 Claims, No Drawings

OTHER PUBLICATIONS

US Appln. 07/896908 Mottet et al. filed Jun. 11, 1992.

M. W. Demler, "Basic Refractories for Cupola Service", American Foundrymen's Society, 1952 Annual Meeting, Reprint No. 52-20, pp. 1-4.

Fiszer, B., et al., "Zastosowanie materialow ogniotrwalych w urzadeniach cieplnych", *Org. Str.*, Slask-Katowice Ed. (1969), pp. 21-24, 37-39, 50, 51, and 60-62 (French translation).

Gibas, T., "Spieki cermamiczne I ceretale", *Oryg. Str.*, WNT Warsaw (1961), pp. 94, 109, 123, 124, and 138-140 (French translation).

PROCESS FOR FORMING A COHERENT REFRACTORY MASS ON A SURFACE

CROSS-REFERENCE TO RELATED APPLICATIONS

This application is a Continuation-In-Part of U.S. application Ser. No. 07/728,884 filed Jul. 10, 1991, now abandoned.

BACKGROUND OF THE INVENTION

1. Field of the Invention

The present invention relates to a process of forming a coherent refractory mass on a surface by projecting against this surface, simultaneously with oxygen, a mixture of refractory particles and combustible particles which react in an exothermic manner with the projected oxygen and release sufficient heat to form, under the action of the heat of combustion, the aforesaid refractory mass. The invention also relates to a mixture of particles intended for a process of forming a coherent refractory mass on a surface by projecting the mixture and oxygen against the surface, the mixture comprising refractory particles and particles of a combustible substance which are capable of reacting exothermically with the oxygen in order to release sufficient heat to form, under the heat of combustion, the aforesaid refractory mass.

2. Background of the Art

If it is desired to form a refractory mass in situ on a surface, one can choose between two known principal processes.

According to the first of these processes, which is generally referred to as "ceramic welding" and which is illustrated in British Patents GB 1,330,894 (Glaverbel) and GB 2,170,191 (Glaverbel), which correspond respectively to U.S. Pat. Nos. 3,800,983 and 4,792,468, the disclosures of which are incorporated herein by reference, a coherent refractory mass is formed on a surface by projecting onto the latter a mixture of refractory particles and combustible particles in the presence of oxygen. The combustible particles are particles whose composition and granulometry are such that they react in an exothermic manner with the oxygen while forming a refractory oxide and while releasing the necessary heat for melting, at least superficially, the projected refractory particles. Aluminum and silicon are examples of such combustible substances. It is known that silicon, strictly speaking, is classified as a semiconductor, but because silicon behaves like certain metals (it is capable of undergoing considerable exothermic oxidation to form a refractory oxide), these combustible elements are referred to herein as combustible "metallic" substances for reason of simplicity. In general, it is recommended to perform the projection of particles in the presence of a high concentration of oxygen, for example, by using oxygen of commercial quality, as a gas carrier. In this manner, a coherent refractory mass is formed that adheres to the surface onto which the particles are projected. Because of the very high temperatures that the ceramic welding reaction can reach, it can penetrate slag which might be present on the surface of the refractory substance being treated, and it can soften or melt the surface of the refractory substance being treated in such a way that a good bond is produced between the treated surface and the newly formed refractory mass.

These known ceramic welding processes can be employed for forming a refractory article, for example, a block having a particular shape, but they are most widely used for forming coatings or for repairing bricks or walls and are particularly useful for repairing or reinforcing existing refractory structures, for example, for repairing walls or coating refractory equipment, such as furnace walls in glassmaking or coke furnaces.

This operation is generally performed when the refractory base is hot. This makes it possible to repair eroded refractory surfaces while the equipment remains substantially at its working temperature and, in certain cases, even while it is operating.

The second known process for forming a refractory mass on a surface is generally referred to as "flame spraying". It involves directing a flame to the site where a refractory mass is to be formed and spraying refractory powder across this flame. The flame is fed by a gaseous fuel or liquid or even coke powder. It is apparent that the efficient utilization of this flame spraying technique requires complete combustion of the fuel in order to generate the hottest flame possible and to attain maximum efficiency. In general, the temperature of the flame obtained with a flame spraying process is not so high as that which may be obtained with a ceramic welding technique, with the result that coherence of the formed refractory mass is not so good, and since the bond between the new refractory mass and the surface of the refractory base is formed at a lower temperature, this bond will not be as firm. Moreover, such a flame is less apt than a ceramic welding reaction to penetrate slag which might be present on the refractory surface being treated.

The composition of the mixture used in a ceramic welding process is generally chosen in such a way as to produce a repair mass which has a chemical composition similar or close to that of the basic refractory. This helps to ensure compatibility with and adhesion to the new material and the base material on which it is formed.

We have observed, however, that problems occur if it is desired to repair certain types of refractory structures even if a refractory mass of a chemical composition is formed which is similar to that of the basic refractory mass.

For example, repairing refractory surface structures having a silicon carbide base with a mixture containing primarily carbon and silicon particles and also particles of metallic combustible substances, produces a refractory mass which does not always demonstrate sufficient adhesion to the base refractory.

Refractories having a base of silicon carbide are used in certain metallurgy equipment, in particular, in blast furnaces in the iron industry or in zinc distillation columns. During the operation of this equipment, certain portions of the refractory structures may have a rather low minimum operating temperature, for example, on the order of 700° C., and may additionally be subjected to significant variations in ambient temperature. It has been observed that the refractory masses produced by known techniques on these parts of refractory structures do not always demonstrate sufficient adhesion to the base refractory mass and, in certain cases, particularly when the repair is made on a block or a refractory wall whose temperature is low, the new refractory mass becomes completely separated from the base refractory mass and detaches itself during operation of the equipment.

Similar problems present themselves if one desires to repair refractory structures having a high density silica base (so named in order to distinguish them from traditional silica refractories whose density is lower) used in certain coke furnaces. Even though one may form a refractory similar in chemical composition to the base refractory mass, the new mass does not always adhere sufficiently and may even separate rapidly from the base refractory mass when the furnace is in operation.

It is an object of the present invention to solve the foregoing problems.

SUMMARY OF THE INVENTION

The present invention relates to a process for forming a coherent refractory mass on a surface of a refractory by projecting against this surface, simultaneously with oxygen, a mixture of refractory particles and combustible particles which react in an exothermic manner with the projected oxygen and release sufficient heat to form, under the action of the heat of combustion, the refractory mass, characterized in that the mixture comprises combustible silicon particles, refractory particles of one or a plurality of substances which constitute the major portion by weight of the mixture, as well as particles of a nonmetallic substance and/or particles whose composition is such that, during the formation of the refractory mass, they generate the aforesaid nonmetallic substance so that the aforesaid nonmetallic substance causes the incorporation of silica, formed by the combustion of silicon, into a crystalline lattice.

The present invention also relates to a mixture of particles intended for a process of forming a coherent refractory mass on a surface by projecting the mixture and oxygen against the surface, the mixture comprising refractory particles and particles of combustible substance which are capable of reacting exothermically with oxygen to release sufficient heat to form, under the action of the heat of combustion, the aforesaid refractory mass, characterized in that the mixture comprises combustible particles of silicon, refractory particles of one or a plurality of substances which constitute the major portion by weight of the mixture, as well as particles of another substance and/or particles whose composition is such that, when the refractory mass is formed, they generate the aforesaid other substance so that this aforesaid other substance causes the incorporation into a crystalline lattice of the silica formed by the combustion of silicon.

Such a mixture and such a process are useful for forming high quality refractory masses for the repair of surfaces such as, for example, refractory structures with surfaces having a base of silicon carbide or high density silica. It is possible to obtain a refractory mass which demonstrates excellent adherence to the base refractory and which retains this adherence when the repaired surface undergoes repeated variations in thermal conditions during the operation of the equipment. Moreover, these advantageous characteristics may also be obtained when the repair is made on a surface whose temperature is relatively low, for example, 700° C.

The refractory masses produced according to the invention present thermal expansion properties which are different from those that would be obtained if the starting mixture did not contain any substance causing the incorporation into a crystalline lattice of the silica formed by the combustion of silicon. The inventors believe that the advantages obtained by the invention are due, at least in part, to this difference and that the refractory masses obtained demonstrate thermal expansion properties which are well adapted to those of the refractory structures in question.

Various substances are suitable for inducing, during the formation of the refractory mass, the incorporation of silica, formed by the combustion of silicon, into a crystalline lattice.

A mixture of particles may be used which comprises a substance or substances whose composition is such that, when the refractory mass is formed, it/they generate a substance causing the incorporation of silica formed by the combustion of silicon, into a crystalline lattice. For example, peroxides such as calcium peroxide, nitrides, carbides may be used.

Oxides such as calcium oxide or iron(II) oxide may also be used as the substance causing the incorporation of silica, formed by the combustion of silicon, into a crystalline lattice. An oxide may be introduced in the form of a compound, for example calcium oxide may be introduced in the form of wollastonite.

The aforesaid substance causing the incorporation of silica, formed by the combustion of silicon, into a crystalline lattice, is preferably introduced into the mixture in the form of magnesia particles.

The presence of this compound in the mixture, which is projected onto the refractory surface to be repaired, helps to ensure correct heat resisting properties of the refractory mass formed.

Moreover, the introduction of magnesia into the mixture permits the formation of a refractory mass in which one portion at least of the silica formed by the combustion of silicon is incorporated into a crystalline lattice of the forsterite type. This also helps to ensure correct heat resisting properties of the refractory mass formed.

Preferably, the mixture comprises combustible aluminum particles. Aluminum particles may be rapidly oxidized with a significant release of heat and form refractory oxides themselves. The adaptation of this characteristic thus favors the formation of high quality refractory masses.

If the mixture contains aluminum as well as magnesia, a refractory mass may be formed in which one portion at least of the silica formed by the combustion of silicon is incorporated into a crystalline lattice of the forsterite type and/or into a crystalline lattice of the spinel type and/or into a crystalline lattice of the cordierite type.

The presence of a crystalline lattice of the cordierite type in the refractory mass formed helps to ensure excellent resistance to thermal shock of this mass. The presence of a crystalline lattice of the forsterite type and/or spinel type, on the other hand, favorably influences the heat resistance of the formed refractory mass.

The present invention is particularly useful for repairing refractories having a silicon carbide base or refractories having a high density silica base. Consequently, it is preferred for ceramic welding to be carried out with the help of a mixture whose major portion by weight comprises silicon carbide or silica, respectively.

It goes without saying that the invention may also be useful for repairing other types of refractories than the ones previously mentioned and, in such a case, a substance or substances constituting the major portion by weight of the mixture is chosen as a function of the composition of the refractory one desires to repair.

DESCRIPTION OF THE PREFERRED EMBODIMENTS

The present invention will now be further illustrated in more detail with the help of the following examples:

EXAMPLE I

A refractory mass was formed on a wall of a zinc distillation column. This wall comprises bricks having a silicon carbide base. A mixture of refractory particles, particles of a combustible substance which is exothermically oxidizable to form a refractory oxide, and magnesia particles was projected onto these bricks. The temperature of the wall was 800° C. The mixture was projected at the rate of 60 kg/h into a stream of pure oxygen. The mixture had the following composition by weight:

|     |         |
| --- | ------- |
| SiC | 79%,    |
| Si  | 8%,     |
| Al  | 5%, and |
| MgO | 8%.     |

The silicon particles had a particle size, i.e., dimension, below 45 μm and a specific surface area ranging between 2,500 and 8,000 cm²/g. The aluminum particles had a particle size below 45 μm and a specific surface area ranging between 3,500 and 6,000 cm²/g. The particle size of the silicon carbide particles was less than 1.47 mm, with 60% by weight thereof having a particle size ranging from 1 to 1.47 mm, 20% from 0.5 to 1 mm, and 20% below 0.125 mm. The MgO particles had an average particle size of approximately 300 μm. "Average particle size" or "average dimension" designates a particle size such that 50% by weight of the particles have a smaller particle size than this average.

The wall which was treated in this manner was subjected to significant variations of ambient temperature and it was observed that the new refractory mass adheres durably to the support.

The structure of the formed mass was examined under the microscope. Excellent continuity was observed between the new refractory mass and the base refractory mass. It was also observed that the silica formed by the combustion of silicon was incorporated into the crystalline lattices of forsterite, cordierite and alumina spinel.

For the purpose of comparison, a mixture not containing magnesia was projected under the same conditions. The composition by weight of this mixture was as follows:

|     |          |
| --- | -------- |
| SiC | 87%,     |
| Si  | 12%, and |
| Al  | 1%.      |

It was observed that the refractory mass formed separated rapidly from the wall and detached itself in solid blocks when the zinc distillation column continued to operate.

EXAMPLE 2

As a variation of Example 1, a mixture having the following composition by weight was used:

|     |         |
| --- | ------- |
| SiC | 82%,    |
| Si  | 8%,     |
| Al  | 5%, and |
| MgO | 5%.     |

The wall being repaired was comprised of bricks having a silicon carbide base and had a temperature of 700° C.

The refractory mass obtained adhered durably to the wall.

EXAMPLE 3

The object here was to form a refractory mass on a wall of a coke furnace comprising high density silica bricks. While the apparent density of traditionnal silica bricks is on the order of 1.80, the apparent density of high density bricks is approximately 1.89. Such bricks have recently appeared on the refractory material market and present advantageous characteristics, by comparison with traditional silica bricks, notably with respect to their properties of gas permeability and thermal conductivity.

The repair was performed on a wall whose temperature was approximately 750° C. with the help of the following mixture which contained by weight:

|       |           |
| ----- | --------- |
| $SiO_2$ | 80.5%     |
| Si    | 11.1%     |
| Al    | 1%, and   |
| MgO   | 7.4%.     |

The particle size of the $SiO_2$ particles was less than 2 mm, with a maximum of 30% by weight thereof having a particle size ranging from 1 to 2 mm, and less than 15% by weight thereof having a particle size below 100 μm.

The formed mass adhered durably to the wall.

By contrast, projection under the same operating conditions of a similar mixture, but one not containing magnesia, furnished a refractory mass which separated from the wall if the latter was subjected to various thermal conditions which are present when the furnace is in operation.

EXAMPLE 4

A siliceous mass was produced on a wall of a coke furnace which was subjected to significant heating cycles and whose maximal temperature did not exceed 900° C.

Repair was realized on a wall having a temperature of 750° C. by projecting a mixture at the rate of 60 kg/h into a stream of pure oxygen. The mixture had the following compositions by weight:

|                         |     |
| ----------------------- | --- |
| $SiO_2$                 | 80% |
| $CaO.SiO_2$ (wollastonite) | 8%  |
| Si                      | 8%  |
| Al                      | 4%  |

The $CaO.SiO_2$ particles had an average particle size of approximately 300 μm. The particle size of the combustible particles Si and Al was the same as in Example 1. The silica had the same particle size as in the siliceous mixture of Example 4. The silica was incorporated into a crystalline lattice of $Al_2O_3.SiO_2.CaO$.

It is understood that various other modifications will be apparent to and can be readily made by those skilled in the art without departing from the scope and spirit of the present invention. Accordingly, it is not intended that the scope of the claims appended hereto be limited to the description set forth above but rather that the claims be construed as encompassing all of the features of patentable novelty which reside in the present invention, including all features which would be treated as equivalents thereof by those skilled in the art to which the invention pertains.

What is claimed is:

1. A ceramic welding process for forming a coherent refractory mass on a surface of a refractory, which refractory is comprised of at least one silicon compound, the process comprising:
   (a) providing a mixture comprised of:
      (1) combustible particles including silicon particles,
      (2) refractory particles of at least one refractory substance selected from the group consisting of silicon carbide particles and silica particles, which refractory particles constitute a major portion by weight of the mixture, and (3) particles of a non-metallic precursor of another substance selected from the group consisting of CaO, MgO, FeO, and mixtures thereof, which another substance causes incorporation of silica, formed by combustion of the silicon particles, into a crystalline lattice of a compound formed between the silica and the another substance within the coherent refractory mass being formed; and (b) projecting the mixture against the surface of the refractory, simultaneously with substantially pure oxygen, so that the combustible particles react in an exothermic manner by combusting with the projected oxygen and release sufficient heat to form the coherent refractory mass under action of heat of combustion, and so that silica, formed by combustion of the silicon particles, is incorporated into the crystalline lattice of a compound formed between the silica and the another substance, wherein the particles of a non-metallic precursor of another substance are selected from the group consisting of wollastonite ($CaO.SiO_2$), a peroxide, a nitride, and a carbide.

2. The ceramic welding process according to claim 1, wherein the combustible particles further comprise aluminum particles.

3. The process according to claim 2, wherein at least a portion of the silica formed by the combustion of the silicon particles is incorporated into a crystalline lattice of a compound which is ($Al_2O_3.SiO_2.CaO$).

4. The process according to claim 1, wherein the non-metallic precursor of another substance is wollastonite ($CaO.SiO_2$).

5. The process according to claim 1, wherein the non-metallic precursor of another substance is calcium peroxide.

6. The ceramic welding process according to claim 1, wherein the particles of a non-metallic precursor of another substance have an average particle size which does not exceed 300 µm.

7. A process of forming a coherent refractory mass on a refractory surface in which substantially all silica formed by combustion of silicon particles is incorporated into a crystalline lattice of a compound formed between the silica and another substance whereby improved adherence of the refractory mass to the refractory surface is provided, the process comprising the ceramic welding process recited in claim 1.

* * * * *